March 20, 1962 G. W. ENSIGN 3,025,864
DISHWASHER
Filed Aug. 16, 1957 2 Sheets-Sheet 1
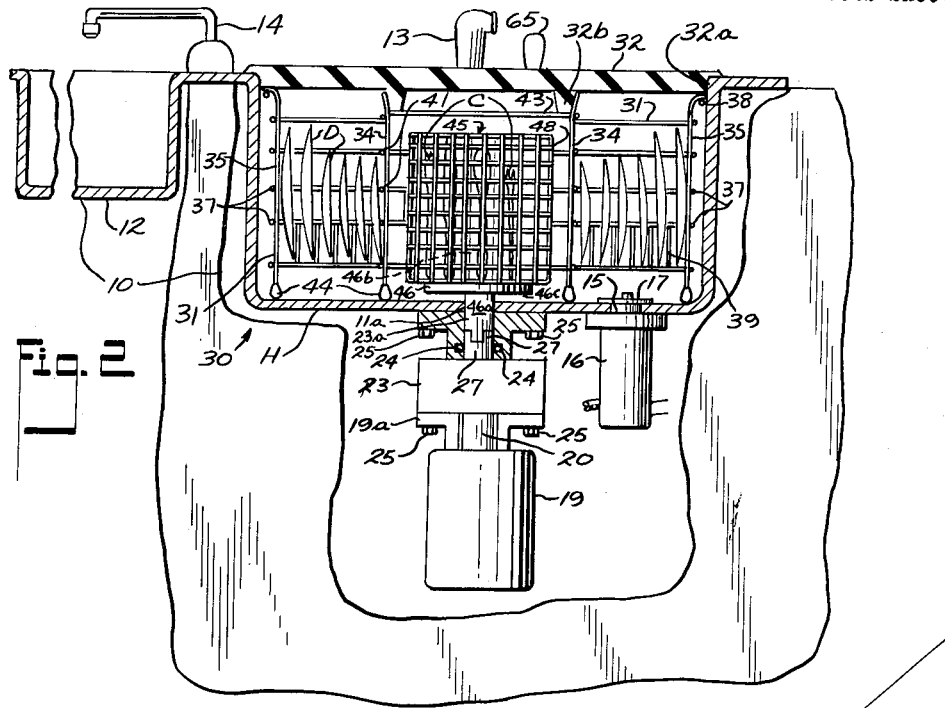
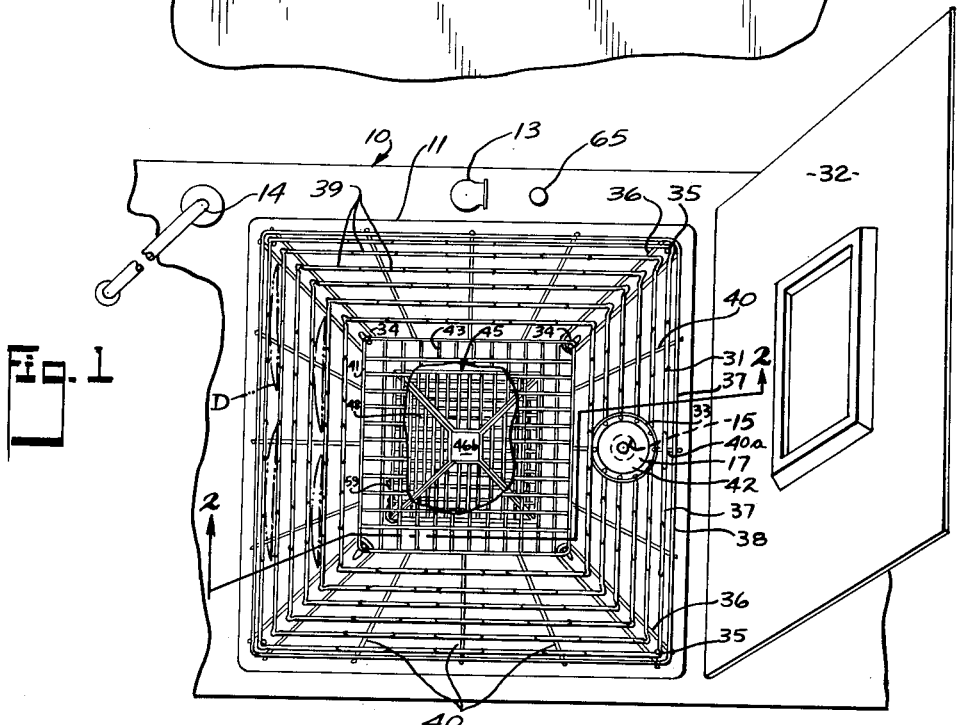
INVENTOR.
GERTRUDE W. ENSIGN
BY
Hyde, Meyer, Baldwin & Doran
ATTORNEYS

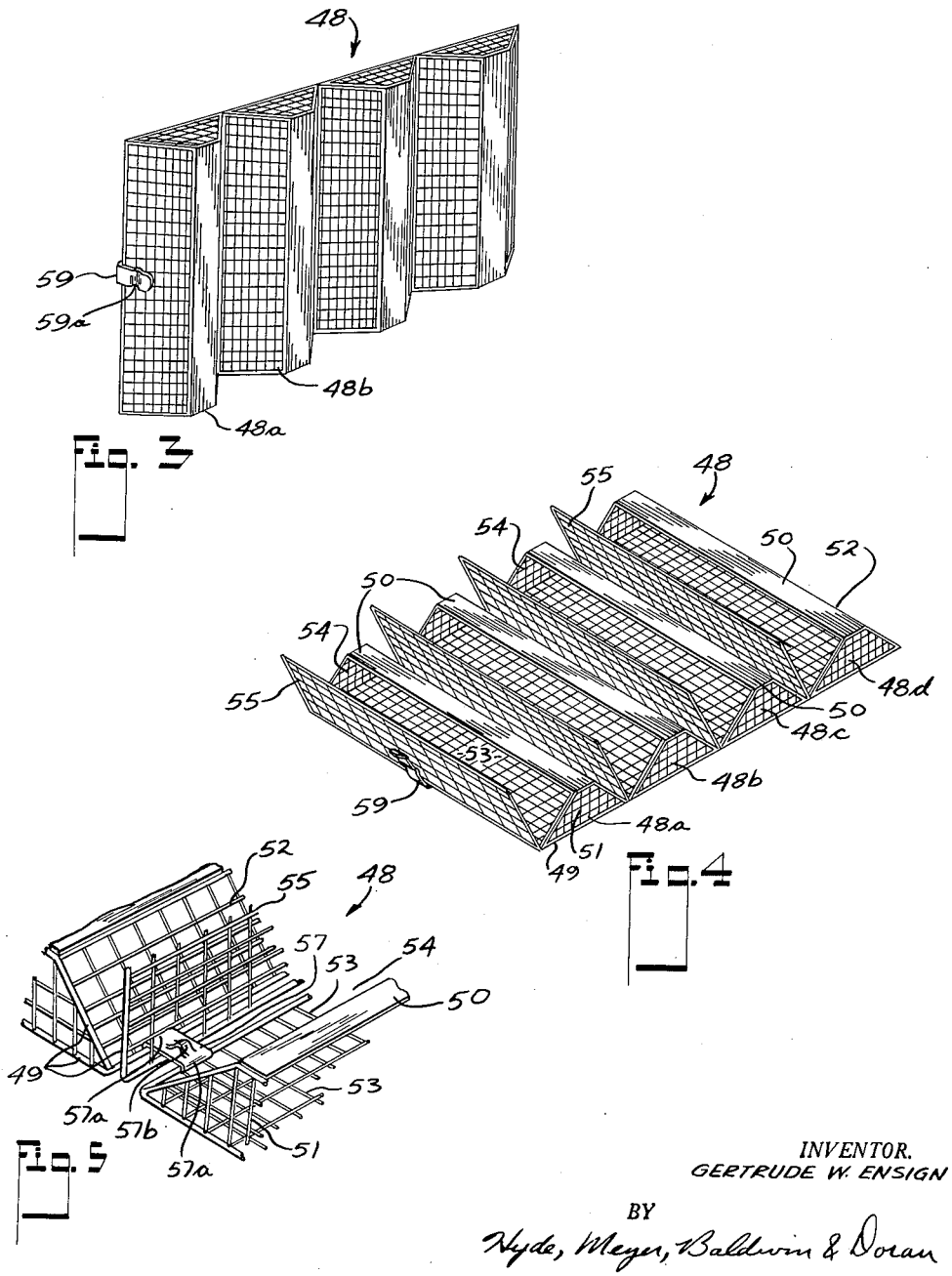

3,025,864
DISHWASHER
Gertrude W. Ensign, Cleveland, Ohio
(1170 Sunset Drive, Manheim Apt. 4, Alliance, Ohio)
Filed Aug. 16, 1957, Ser. No. 678,639
13 Claims. (Cl. 134—115)

This invention relates to improvements in a kitchen article washing apparatus and more particularly to a dishwasher for washing dishes, cups, knives, forks, spoons, etc. found in the kitchen.

One of the objects of the present invention is to provide a conventional kitchen sink modified to permit the detachable connection of components of a kitchen article washing apparatus within the sink so that the kitchen articles may be washed by a power drive when the components are located in the sink, or the sink may be used in the conventional manner when the components are removed while no projections therefor remain above the inner surface of the sink.

A further object of the present invention is to provide a washing apparatus characterized by its contributions to gracious living for the housewife by permitting kitchen articles to be washed and stored quickly and without damage, and with structural simplicity, inexpensive manufacturing cost, ease of assembly and disassembly, compactness, and/or ease of operation or use.

A further object of the present invention is to provide a dishwasher wherein the silverware is separated from the china, wherein each of the types of silverware or cutlery have separated compartments, and/or wherein all kitchen articles being washed are adequately protected against damage from different classes of articles and against damage by their supporting basket structure.

A further object of the present invention is to provide an apparatus including both a sink, similar to a conventional sink, and a power driven dishwasher so that the user gets two units, both a dishwasher and sink, combined in one to provide economy of manufacture, reduction in installation cost, and compactness of design so that minimum space is required in the kitchen.

A further object of the present invention is to provide a dishwasher discharging its liquid into a disposal for comminuting the food particles washed from the kitchen articles in the dishwasher.

A further object of the present invention is to provide a basket removably locatable in working position in a sink and/or adapted to serve as a component of a power driven dishwasher.

A further object of the present invention is to provide a basket locatable in a sink, a cover for said sink, and means on the cover or sink for coacting with the basket to maintain clearance relationship between the basket and a power driven agitator in the sink.

A further object of the present invention is to provide a basket adapted to be inserted into working position in a fluid basin or sink of a dishwasher structure with this basket including a plurality of sections adapted to be moved between wrapped and unwrapped position, adapted to be mounted upon a driving member of an agitator unit, adapted to serve as a stationary kitchen article holding basket around an agitator, adapted to have doors on each section automatically locked in covering position over its associated opening when the sections are in their wrapped position, and/or a lock means for locking the sections in wrapped position.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

FIG. 1 is a top plan view of a kitchen article washing apparatus with the cover partially removed and with the stationary basket and the agitator unit located in working position in the sink and with a portion of a safety screen cut away;

FIG. 2 is a vertical sectional view taken along the line 2—2 of FIG. 1;

FIG. 3 is a perspective view of the sections of the agitator basket in their unwrapped position with the section doors closed;

FIG. 4 is a perspective view of the agitator basket sections in the unwrapped position with the sections generally coplanar and laid upon a table top (not shown) for convenient loading and unloading; while FIG. 5 is a perspective view of a portion of the hinge type connecting means between adjacent sections and a door of one of the sections.

Before the kitchen article washing apparatus here illustrated is specifically described, it is to be understood that the invention here involved is not limited to the structural details or arrangement of the parts here shown since apparatuses embodying the present invention may take various forms. It also is to be understood that the phraseology or terminology herein employed is for purposes of description and not of limitation since the scope of the present invention is denoted by the appended claims.

While the present invention might be adapted to various types of apparatuses, it has been chosen to show the same as a dishwasher, adapted to be used with a kitchen sink as a component element thereof, for washing kitchen articles, such as chinaware or other dishes D and silverware and cutlery C. Since the component parts within the sink are detachably connected in working position therein and may be removed, the sink may be used as a conventional sink when not used for dishwashing purposes.

A basic sink 10 is adapted to hold washing liquid in either basin 11 or 12 thereof with this liquid discharged therein by faucet 14 associated therewith. The sink may also be provided with spray rinse head 13, drain or discharge opening 15, stopper 17 of any suitable design operatively associatable with opening 15 to retain the liquid in basin 11 and movable between drain open and drain closed positions by either rotation or vertical movement, and disposal unit 16, if so desired. The drain 15 and disposal 16 may be located in any convenient location, such as in the corner of sink basin 11. Disposal unit 16 is of any conventional type for attachment to a sink, such as an electric motor driven grinding unit for receiving the discharged liquid from drain 15 and for comminuting the solid particles washed through drain 15 by the liquid in sink 10 so that they will be easily conveyed by the liquid into the sewer. A suitable disposal is disclosed in United States Patent No. 2,646,222, issued July 21, 1953, to Martin J. Green. Although sink or sink element 10 is similar to a conventional sink but is preferably deeper, it should be understood that the word "sink" in its broader sense includes any basin or depression formed of metal or other material to retain liquid, such as the basin in the conventional automatic dishwasher. It should be readily apparent that the structure described heretofore can be used as a conventional sink when the detachable parts mentioned hereinafter are removed therefrom.

A motor 19 is located on the sink below its bottom surface and is secured to the sink by a suitable bracket assembly. This motor has motor shaft 20 serving as an input or drive shaft for transmission unit 23 having motor driven output shaft 27 thereon extending coaxially with hole 11a in the sink. This transmission can cause driven shaft 27 to be rotated continuously in one direction but preferably causes it to slowly oscillate in opposite directions. This preferred oscillation movement increases the agitation of the liquid and the slow speed provides safety of operation and minimizes chance of damage to the kitchen articles. Bracket 19a of the motor is secured to transmission unit 23 with the transmission unit being secured by its own bracket 23a to the lower face of sink basin 11 with the brackets and the unit being detachably secured together by screws 25. Seal 24 surrounds transmission output shaft 27 to prevent water leakage down into transmission unit 23 and motor 19.

The assembly has a stationary unit including not only the sink or basin 10 but also the stationary basket 31 and detachable cover 32. The basket 31 is removably located in a working position in the sink basin 11 for detachably holding kitchen articles to be washed therein.

This basket 31 may be of any suitable construction surrounding a hollowed out center portion in the manner shown. Here, the basket 31 illustrated has four inner vertical posts 34 and four outer vertical posts 35 connected by four diagonal corner members 36. Surrounding and secured to the four outer posts 35 are five outer endless members 37 and an upper edge endless member 38, while five inner endless members 41 are secured to inner posts 34. Five divider members 39 are concentric with the outline of the stationary basket 31 and are formed in right angle bends to form in vertical planes U-shaped and inverted U-shaped endless members for supporting dishes D, other type china, glassware, or other type kitchen articles therein. Eleven diagonal brace members 40 are secured at spaced points to the base of the U-shapes of divider members 39 and to the lower endless members 37 and 41. The ends of divider members 39 are secured to a ring member 33 at the right-hand end of FIG. 1 and the brace member 40a adjacent thereto is formed into two parts with the outer ends secured to members 37 or 41 and with the inner ends secured to ring member 33 so that ring member 33 forms a cylindrical opening 42 in basket 31 with a vertical central axis. Component members and posts of basket 31 are respectively secured to contacting members and posts at appropriate places to make a rigid construction of the type illustrated. A square safety screen member 43 may be secured at opposite corners to inner posts 34 and to the top inner endless member 41 if this safety feature is desired. Feet 44 are provided at the bottom of each post 34 and 35 with each foot being formed of resilient material, such as hard rubber to prevent scratching of the inner surface of sink basin 11.

The cover or cover element 32 is removably mounted on the open top of the sink basin 11 to prevent liquid splashing during the dishwashing operation.

An agitator unit 45 is removably attached in sink basin 11 in a working position in driving relationship to the motor driven output shaft 27 of the transmission unit 23 so as to be driven thereby. Unit 45 includes a driving member 46 having a driven shaft end 46a, a square shaft 46b, and a flange 46c interconnected together in coaxial alignment. Driven shaft end 46a in FIG. 2 has a downwardly projecting tongue engaging diametrically in driving relationship with an upwardly opening groove in transmission unit output shaft 27 to be driven thereby. Shaft end 46a is also adapted to be detached by this connection from the motor driven shaft 27 in the working position in FIG. 2 and removed from the sink basin 11 so that no projection therefor remains above the bottom or inner surface of the sink basin 11. The agitator unit 45 also includes an agitator basket 48 adapted to be supported by the circular flange 46c while the square shaft 46b has basket locating surfaces formed thereon by its four square forming surfaces, which surfaces serve as a drive key type drive or coupling means for basket 48. Hence, basket 48 is detachably connectable telescopically over square shaft 46b in driving relationship to the driving member 46 in the working position illustrated in FIG. 2 within the sink basin 11.

This agitator basket 48 is removably located in the working position in the sink element 11 surrounding the driving member 46 with the basket adapted to detachably hold kitchen articles, such as silverware C therein to be washed. The agitator basket 48 has a plurality of non-communicating separate sections, here shown as four in number as section 48a, 48b, 48c, and 48d to receive articles, such as silverware C, for washing. These four sections are segment shaped and provide pockets for holding the kitchen articles. Each section in FIG. 4 includes a frame formed at its edges of interconnected rod-like members with a metal plate 50 secured to the narrow, upper end in FIG. 4. Each section includes two wire mesh end members 51, a wire mesh inclined member 52 and a wire mesh bottom member 53 connected to the rod-like members 49 of the frame in any suitable manner, such as welding, soldering, etc. This construction will form an open side 54 in each section adapted to be closed by a door 55 adapted to swing between covering and uncovering positions relative to this open side 54. Door 55 has a screen mesh secured to a surrounding frame formed of rod-like members 49.

Agitator basket 48 includes a hinge-type connecting means operatively connecting the frames of adjacent sections and their doors 55 for proper coaction. This hinge type connecting means between each section includes two or more axially aligned hinge clips 57. Hinge clip 57 has two opposite bent-over ends 57a adapted to be rotatably secured over the frame type rod-like members 49 of adjacent sections and has a struck up center 57b adapted to rotatably support the rod-like member 49 of the door 55. Hence, these hinge clips 57 operatively connect adjacent sections for a wrapping movement from an open or unwrapped position in FIG. 4 with the sections 48a—48d generally coplanar for convenient loading and unloading upon a table top to a wrapped or closed position with the sections forming a closed figure, such as a square, with the sections nested together and wrapped around the square shaft 46b with each section having the inner surface of its plate member 50 engaging one of the square sides of square drive shaft 46b as a locating surface for mounting agitator basket 48 in the working position in the sink basin 11 fixed against rotation relative to the driving member element 46. Also, each door 55 is adapted to swing between covering and uncovering position relative to the open side 54 while the agitator basket 48 is in the open or unwrapped position in FIG. 4. It should be noted that the basket sections 48a—48d, when in the closed or wrapped position of FIGS. 1 and 2, automatically lock the doors 55 in covering position over the open sides 54 by engagement between each door and its adjacent section.

Also, a basket lock means may be provided with coacting portions on opposite ends of the agitator basket sections in FIG. 4 for locking the four sections in the wrapped or closed position of FIGS. 1 or 2 to prevent disassembly thereof by the centrifugal force during oscillation of the driving member 46. Here, latch 59 is secured at one end to basket section 48a and has a projection 59a on its inner surface adapted to coact with the wire mesh or rod-like frame members of the bottom members 53 of basket section 48d on the opposite end of the basket sections in FIG. 4.

Means is furnished to provide a coaction between the stationary basket 31 and sink basin 11 to maintain the proper clearance relationship between the periphery of the agitator unit 45 and the central space surrounded by the stationary basket 31. Cover 32 has a peripheral groove 32a coacting with the inner top edge of the sink basin 11 and a downwardly projecting endless shoulder 32b coacting with the diverging upper end of inner posts 34, when cover 32 is in closed position over sink 11, on stationary basket 31 to maintain this clearance relationship. It should be apparent that other type coacting means may be provided for maintaining this clearance relationship, such as coacting locating surfaces on the removable stationary basket 31 and the inner surface of the sink basin 11.

The mode of operation should now be clearly apparent. When the kitchen article washing parts are removed, the sink can be used as a conventional double basin kitchen sink with faucet 14, spray rinse head 13, drain 15, disposal 16 and stopper 17 being used in the normal manner with basins 11 and 12. The stationary unit 30 and the agitator unit 45 are constructed so that the agitator unit 45, the stationary basket 31, and cover 32 may be detached from the working position within or on the sink and removed from the sink 10 with no projections therefor remaining above the bottom or inner surface of the sink basin 11. These removal parts 31, 32, 46 and 48 may be conveniently stored in a cabinet under the sink when they are removed while sink 11 is being used in the conventional manner. Driving member 46 of the agitator unit 45 telescopes out of the sink hole 11a so that the only interruption in the continuity of the inner surface of sink basin 11 is the hole 11a extending down to the upper end of the transmission unit output shaft 27. After agitator basket 48 is removed, latch 59 may be snapped open and the basket sections unwrapped to a generally coplanar position to be placed upon a table top for convenient loading and unloading. Then, the doors 55 for the respective sections may be swung open to their open side uncovering position shown in FIG. 4 to permit the loading of silverware and other cutlery C therein with each of the basket sections 48a, 48b, 48c and 48d containing a different type silverware or cutlery, such as spoons in one section, forks in another section, knives in another section, etc. Then, the agitator basket sections can be swung about their hinge connections to a wrapped position with the sections internesting, and then the latch 59 may be snapped to lock the sections together in the generally square formation shown in FIGS. 1 and 2. Then, the agitator basket 48 may be telescoped over the square drive shaft 46b down against the basket supporting flange 46c and the driven shaft end 46a of the driving member inserted into sink hole 11a into driving contact with transmission unit driven shaft 27 either before or after the agitator basket 48 is telescopically mounted on the square shaft 46b. Then, stationary basket 31 may be inserted into the sink basin 11 in proper position and the dishes D loaded therein. If the safety screen 43 was omitted on this stationary basket 31, it should be apparent that the agitator basket 48 may then have been inserted after instead of before the stationary basket 31. The kitchen articles C and D need not be scraped clean of food particles but may be loaded into the baskets 31 and 48 directly from the dining table with only bones removed from the dishes. Then, disposal 16 will be energized, spray head 13 will be used to rinse the food particles from the kitchen articles, and disposal 16 will grind up or comminute the food particles as they are washed down the drain by the water from spray head 13. Then, stopper 17 may be moved to drain closed position, as shown in FIGS. 1 and 2. Now, water is discharged from faucet 14 into sink basin 11 and detergent is added thereto. Then, cover 32 is carefully closed over the open top of sink basin 11 with the projection 32a and 32b thereon coacting for locating purposes with the sink and stationary basket 31 respectively. Then, the driving motor 19 is started in operation to oscillate shaft 27 and agitator unit 45 so that it will swirl the water and detergent contained in basin 11 around and against the different kitchen articles so as to clean the silverware, cutlery and dishes. After the washing operation has been completed, the housewife inserts her hand down through cylindrical opening 42 to move stopper 17 to drain open position so that the water and detergent in basin 11 will empty through drain 15. Then, the basin 11 is filled with fresh water after stopper 17 is moved to drain closed position, the motor 19 is energized and the kitchen articles are rinsed; or if preferred, the kitchen articles are rinsed in place by the spray head 13 with the rinse water draining directly down through the open drain 15. Then, the stopper is moved to drain open position to empty the sink, and the kitchen articles are permitted to dry in place. After the kitchen articles have sufficiently dried, the stationary basket 31 may be carried to a point adjacent the storage cupboard and the dishes D removed therefrom, the agitator basket 48 may be telescoped off the drive shaft 46b, spread to the unwrapped position of FIG. 4, and doors 55 swung open to remove the silverware C therefrom for putting in proper storage places so that the silverware is washed and then stored with a minimum of handling.

It should be obvious that many modifications of design can be easily made within the scope of the present invention. For example, square shaft 46b may be replaced by a round shaft and a drive key or lug may be provided in either the shaft portion 46b or the support flange 46c to coact with a keying recess in the agitator basket 48. Also, the agitator basket 48 may have a cylindrical peripheral transverse cross section instead of a square cross section. Also, the agitator basket may use perforated metal members instead of wire mesh members 51, 52 and 53 and wire mesh of the door 55. Also, doors 55 may be replaced by a wire mesh inclined member, similar to member 52, securely attached to the rod-like frame members 49, and then one of the wire mesh end members 51 of each section (the upper end members in FIG. 2) may be omitted to provide an open end wall for loading and unloading the silverware and cutlery C. Also, a conventional agitator may be used in place of the agitator basket 48, if so desired. Also, a conventional lever actuated stopper, similar to the type found on many bathroom wash stands, may be provided for drain opening 15 in place of illustrated stopper 17, if so desired with a manually manipulatable handle 65 provided for the stopper adjacent rinse head 13 on the horizontal top surface of the sink remaining uncovered when cover 32 is closed. Then, stationary basket 31 may be made continuous over the drain 15 and ring members 33 and opening 42 are eliminated. Then, the housewife may move the stopper between the drain open and closed positions while cover 32 is closed and without inserting her hand into the dishwasher.

The component members and posts of the baskets 31 and 48 may be formed of wire coated with rubber or other resilient material to prevent damage to the kitchen articles, especially to the flat silverware, and to the internal inner surface of the sink basin 11 with this rubber coating preferably being colored to provide an attractive display. Also, the stationary basket 31 could be made of foldable sections, similar to the agitator basket 48, so as to have one or more features of the agitator basket if so desired.

Now, it should be readily apparent that all of the advantages mentioned heretofore will be obtained from this design.

Various changes in details and arrangement of parts may be made by one skilled in the art without departing from either the spirit of this invention or the scope of the appended claims.

What I claim is:

1. In a kitchen article washing apparatus, a stationary unit including a sink adapted to hold liquid discharged by a faucet associated therewith and having a drain for discharging said liquid, a motor located below said sink, an agitator unit removably attached in said sink in a working position in driving relationship to said motor to be driven thereby, said stationary unit including a basket removably located in a working position in said sink for detachably holding kitchen articles to be washed therein, said units and motor drive being constructed so that when said agitator unit and the basket are detached from said working position and removed from said sink no projections therefor remain above the bottom of said sink, said stationary unit including a removable cover for said sink, said basket of said stationary unit surrounding said agitator in clearance spaced relationship, and locating means on said cover coacting with rigidly interconnected portions on said stationary basket and rigidly interconnected portions on said sink for maintaining said clearance relationship.

2. In a kitchen article washing apparatus, a stationary unit including a sink element adapted to hold washing liquid, a motor secured to said sink element in a position wherein said motor is not harmed by said washing liquid, an agitator unit attached in said sink element in a working position in driving relationship to said motor to be driven thereby, said agitator unit including a basket removably located in a working position in said sink element for detachably holding kitchen articles to be washed therein, said agitator unit including a driving element driven by said motor, a basket locating surface on one of said elements for detachably connecting said basket thereto against rotation relative to said one element, said basket including a plurality of sections to receive articles for washing and including connecting means operatively connecting said sections for a wrapping movement from an unwrapped position for convenient loading and unloading to a wrapped position with each section having a surface engaging said locating surface to mount said basket in said working position in said sink fixed against rotation relative to said one element.

3. In a kitchen article washing apparatus, a stationary unit including a sink adapted to hold washing liquid, a motor secured to said sink in a position wherein said motor is not harmed by said washing liquid, and an agitator unit attached in said sink in a working position in driving relationship to said motor to be driven thereby, said agitator unit including a basket removably located in a working position in said sink for detachably holding kitchen articles to be washed therein, said agitator unit including a driving member driven by said motor having coupling means for detachably connecting said agitator basket to said driving member in driving relationship in said working position, said agitator basket including a plurality of sections to receive articles for washing and including connecting means operatively connecting said sections for a wrapping movement from an unwrapped position for convenient loading and unloading to a wrapped position for mounting said agitator basket in said working position fixed against rotation relative to said driving member.

4. In a kitchen article washing apparatus, a stationary unit including a sink adapted to hold washing liquid, a motor secured to said sink in a position wherein said motor is not harmed by said washing liquid, and an agitator unit attached in said sink in a working position in driving relationship to said motor to be driven thereby, said agitator unit including a basket removably located in a working position in said sink for detachably holding kitchen articles to be washed therein, said agitator unit including a driving member driven by said motor, said driving member including a shaft and a drive means for detachably connecting said agitator basket telescopically to said shaft of said driving member in driving relationship in said working position, said agitator basket including a plurality of sections to receive articles for washing and including connecting means operatively connecting said sections for a wrapping movement from an unwrapped position for convenient loading and unloading to a wrapped position wrapped around said shaft for mounting said agitator basket in said working position fixed against rotation relative to said shaft.

5. In a kitchen article washing apparatus with a sink adapted to hold washing liquid, a basket adapted to be removably locatable in a working position in said sink for detachably holding kitchen articles to be washed therein, said basket including at least three sections to receive articles for washing and including at least two hinges having parallel hinge axes, each hinge operatively connecting different adjacent sections for a wrapping movement from an unwrapped or open position with said sections generally coplanar to be adapted for convenient loading and unloading upon a table top to a closed or wrapped position having an open center between said sections, said sections having in said wrapped position radially oriented faces on said sections nested together and extending outwardly from said open center and said sections having surfaces for mounting said basket in said working position in said sink, each section of said basket having holes in side walls thereof in said wrapped position for circulation of washing liquid into and out of said basket in said working position.

6. In a kitchen article washing apparatus with a sink adapted to hold washing liquid, a basket adapted to be removably locatable in a working position in said sink for detachably holding kitchen articles to be washed therein; said basket including at least three sections to receive articles for washing with each section having an open side, a door for each section adapted to swing between covering and uncovering positions relative to said open side, and at least two hinges having parallel hinge axes, each hinge operatively connecting different adjacent sections and a door for permitting movement of said sections between an open position for loading and unloading and a closed position having an open center between said sections for mounting said basket in said working position and for permitting movement of said doors between their aforesaid positions in said open position, each section of said basket having holes in side walls thereof in said closed position for circulation of washing liquid into and out of said basket in said working position.

7. In a kitchen article washing apparatus, a stationary unit including a sink adapted to hold washing liquid, a motor secured to said sink in a position wherein said motor is not harmed by said washing liquid, and an agitator unit attached in said sink in a working position in driving relationship to said motor to be driven thereby, said agitator unit including a basket removably located in a working position in said sink for detachably holding kitchen articles to be washed therein, said agitator unit including a driving member driven by said motor, said driving member including a shaft having a basket locating surface thereon to provide a key type drive means for detachably connecting said agitator basket telescopically over said shaft in driving relationship in said working position; said agitator basket including a plurality of sections to receive articles for washing with each section having an open side, a door for each section adapted to swing between open side covering and uncovering positions relative to said open side, hinge type connecting means each operatively connecting adjacent sections and doors for permitting movement of said sections between an open or unwrapped position with said sections generally coplanar for convenient loading and unloading upon a table top and a closed or wrapped position with said sections nested together and wrapped around said shaft as a closed figure, each section having a first surface for engaging said locating surface in said wrapped position for mounting said agitator basket in said working position in said sink fixed against rotation relative to said shaft, and a second surface for automatically locking said doors in said covering positions by said sections while said sections are in said closed position, said second surface permitting movement of said doors between their aforesaid positions in said open position, and lock means on at least two of said sections for locking said sections in closed position.

8. In combination, a stationary unit including a sink adapted to hold liquid discharged by an inlet associated therewith and having a drain for discharging said liquid, a motor located below and secured to said sink and having a shaft driven thereby extending coaxially with a hole in said sink, an agitator unit removably attached in said sink in a working position in driving relationship to said motor driven shaft to be driven thereby, said stationary unit including a basket removably located in a working position in said sink surrounding said agitator unit for detachably holding kitchen articles to be washed therein, said units and motor driven shaft being constructed so that when said agitator unit and the basket of said stationary unit are detached from said working position and removed from said sink no projections therefor remain above the inner surface of said sink, said stationary unit including a removable cover for said sink, said basket of said stationary unit surrounding said agitator in clearance spaced relationship and locating means on said cover coacting with rigidly interconnected portions on said stationary basket and rigidly interconnected portions on said sink for maintaining said clearance relationship.

9. In combination, a kitchen article washing apparatus comprising, a stationary unit including a sink adapted to hold liquid discharged by a faucet associated therewith and having a drain for discharging said liquid, a motor located below and secured to said sink and having a shaft driven thereby extending coaxially with a hole in said sink, an agitator unit removably attached in said sink in a working position in driving relationship to said motor driven shaft to be driven thereby, each of said units including a basket removably located in a working position in said sink for detachably holding kitchen articles to be washed therein, said units and motor driven shaft being constructed so that when said agitator unit and the basket of said stationary unit are detached from said working position and removed from said sink no projections therefor remain above the inner surface of said sink, said stationary unit including a removable cover for said sink, said basket of said stationary unit surrounding said agitator in clearance spaced relationship, and means on said cover coacting with said stationary basket and sink in closed position to maintain said clearance relationship, said agitator unit including a driving member driven by said motor with a flange support for the basket of said agitator serving as said agitator basket and a square shaft having a basket locating surface thereon to provide a key type drive means for detachably connecting said agitator basket telescopically over said shaft in driving relationship in said working position; said agitator basket including a plurality of sections to receive articles for washing with each section having an open side, a door for each section adapted to swing between open side covering and uncovering positions relative to said open side, and hinge type connecting means operatively connecting adjacent sections and doors for permitting movement of said sections between an open or unwrapped position with sections generally coplanar for convenient loading and unloading upon a table top and a closed or wrapped position with said sections nested together and wrapper around said shaft as a closed figure, each section having a first surface for engaging said locating surface in said wrapped position for mounting said agitator basket in said working position in said sink fixed against rotation relative to said shaft, and a second surface for automatically locking said doors in said closed positions by engagement of said sections while said sections are in said closed position, said second surface permitting movement of said doors between their aforesaid positions in said open position, and lock means on at least two of said sections for locking said sections in closed position; and a solid comminuting disposal operatively associated with said drain to receive said discharged liquid and to comminute food particles washed from said articles by said apparatus.

10. The combination of claim 9, wherein said apparatus includes a basket of said stationary unit extending continuously over said drain, and a stopper operatively associatable in said sink with said drain and movable between drain open and drain closed positions, said basket of said stationary unit having an opening over said drain in alignment with said stopper to permit manual movement of said stopper between said positions.

11. The combination of claim 10, wherein said apparatus includes a stopper movable between drain open and drain closed positions relative to said sink drain, and means manually manipulatable outside of the space enclosed by said sink and closed cover for moving said stopper between said positions.

12. An apparatus, as set forth in claim 1, with said locating means including on said cover first stop portions dimensioned to engage said sink on four sides and second stop portions dimensioned to engage said basket on four sides by telescopic action upon downward movement of said cover onto said sink and basket, one of said stop portions being a groove and the other of said stop portions being a shoulder.

13. In combination, a kitchen article washing apparatus comprising a stationary unit including a sink adapted to hold liquid for washing said articles and having a drain for discharging said liquid, a motor secured to said sink in a position wherein said motor is not harmed by said washing liquid, a power driven agitator unit in said sink driven by said motor, said agitator unit including a basket in said sink for detachably holding kitchen articles to be washed therein, and a solid comminuting disposal operatively associated with said drain to receive said discharged liquid and to comminute food particles washed from said articles by said apparatus while said agitator unit is in said sink, liquid dispensing means for washing food particles from the articles located in said basket in said sink prior to operation of said agitator unit so that this last mentioned washing liquid will be received by said disposal, said agitator unit including said basket for detachably holding articles so that liquid from said dispensing means cleans all sides of the articles in the driven agitator and washes food particles into said disposal.

References Cited in the file of this patent

UNITED STATES PATENTS

| | | |
|---|---|---|
| 424,603 | Favor | Apr. 1, 1890 |
| 817,802 | Pittock | Apr. 17, 1906 |
| 1,187,875 | Welty | June 20, 1916 |
| 1,398,664 | Armstrong | Nov. 29, 1921 |
| 1,606,068 | Firth | Nov. 9, 1926 |
| 1,804,715 | Tafel | May 12, 1931 |
| 1,905,523 | Stoddard | Apr. 25, 1933 |
| 1,968,658 | Stoddard | July 31, 1934 |
| 2,403,526 | Harris | July 9, 1946 |
| 2,418,366 | Powers | Apr. 1, 1947 |
| 2,501,887 | Cress | Mar. 28, 1950 |
| 2,669,240 | Thorson | Feb. 16, 1954 |
| 2,707,379 | Guior | May 3, 1955 |
| 2,726,004 | McLeod | Dec. 6, 1955 |

FOREIGN PATENTS

| | | |
|---|---|---|
| 145,876 | Australia | Mar. 25, 1952 |
| 474,149 | Canada | June 5, 1951 |

UNITED STATES PATENT OFFICE

CERTIFICATE OF CORRECTION

Patent No. 3,025,864  March 20, 1962

Gertrude W. Ensign

It is hereby certified that error appears in the above numbered patent requiring correction and that the said Letters Patent should read as corrected below.

Column 10, line 14, for the claim reference numeral "10" read -- 9 --.

Signed and sealed this 10th day of July 1962.

(SEAL)
Attest:

ERNEST W. SWIDER
Attesting Officer

DAVID L. LADD
Commissioner of Patents